United States Patent [19]
Hurst, Jr. et al.

[11] Patent Number: 6,141,358
[45] Date of Patent: Oct. 31, 2000

[54] METHOD AND APPARATUS FOR ALIGNING SUB-STREAM SPLICE POINTS IN AN INFORMATION STREAM

[75] Inventors: Robert Norman Hurst, Jr., Hopewell; Christopher Ward, Glen Ridge, both of N.J.

[73] Assignee: Sarnoff Corporation, Princeton, N.J.

[21] Appl. No.: 09/092,809

[22] Filed: Jun. 5, 1998

Related U.S. Application Data

[60] Provisional application No. 60/053,747, Jul. 25, 1997.

[51] Int. Cl.[7] .................................................. H04J 3/22
[52] U.S. Cl. ............................................................ 370/543
[58] Field of Search ...................................... 370/543, 389, 370/395, 468, 472, 506, 505, 528, 474, 392, 401, 354, 465, 466, 428, 480, 412, 351, 475, 405, 486, 485, 498, 535, 537, 544; 395/200.62; 704/201; 348/465, 473, 6, 7, 12, 13, 16, 460, 385, 387, 10, 426, 409, 415, 408, 403, 400, 401, 397, 390, 384, 420, 470; 714/701, 703, 1

[56] References Cited

U.S. PATENT DOCUMENTS 5,371,547  12/1994  Siracusa et al. ........................ 348/426
5,541,852   7/1996  Eyuboglu et al. ....................... 370/468

OTHER PUBLICATIONS

International Search Report.

Proposed SMPTE Standard for Television—10–Bit 4:2:2 Component and 4fsc Composite Digital Signals—Serial Digital Interface, SMPTE 259M, SMPTE Journal, Aug. 1995, pp. 562–565.

Proposed SMPTE Standard for Television—Serial Data Transport Interface, SMPTE 305M, SMPTE Journal, Apr. 1998, pp. 265–272.

*Primary Examiner*—Dang Ton
*Attorney, Agent, or Firm*—William J. Burke

[57] ABSTRACT

A method and concomitant apparatus for incorporating one or more relatively low bitrate information streams (e.g., MPEG) into a relatively high bitrate information stream (e.g., SDTI) in a manner aligning low bitrate sub-stream splice entrance points and splice exit points within the frame boundaries of the high bitrate information stream. In this manner the splicing of the relatively high bitrate information stream at appropriate In Frames and Out Frames will provide relatively seamless splicing of information sub-streams.

24 Claims, 6 Drawing Sheets

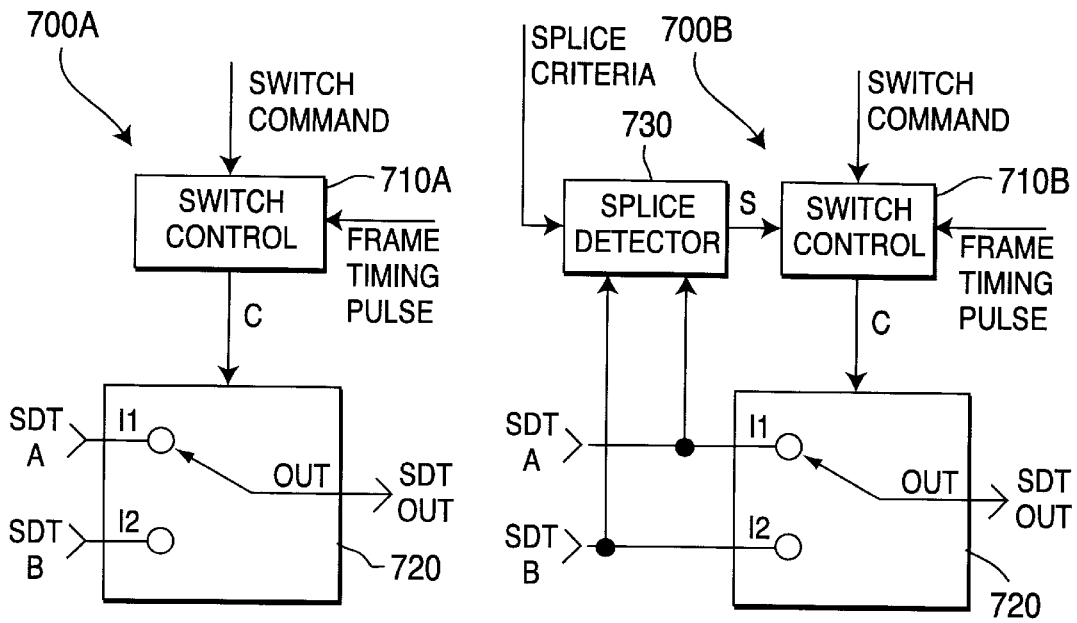
FIG. 7A  FIG. 7B
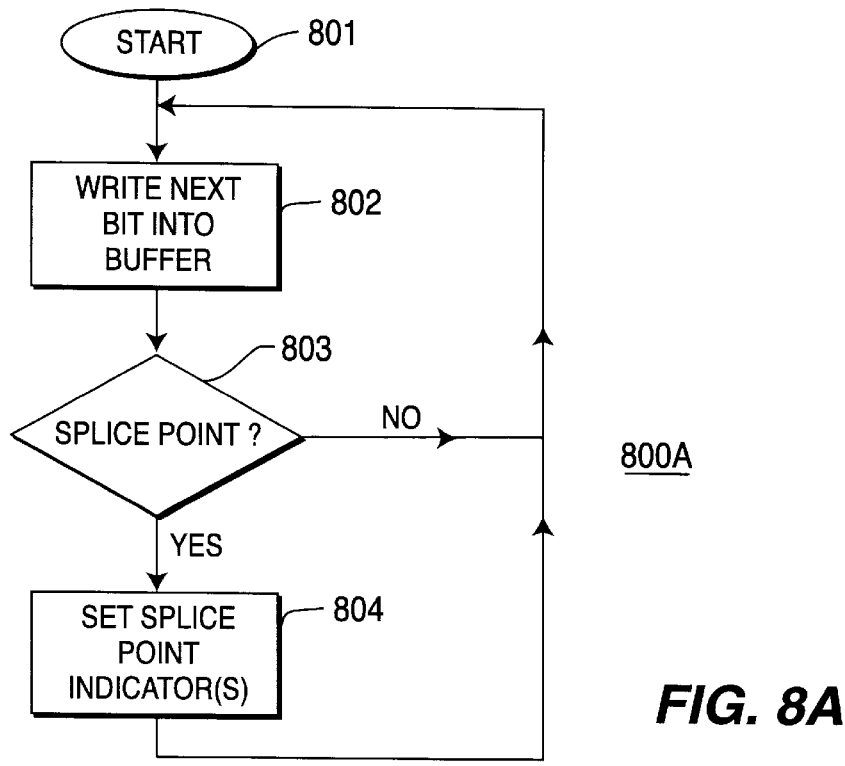
FIG. 8A

6,141,358

METHOD AND APPARATUS FOR ALIGNING SUB-STREAM SPLICE POINTS IN AN INFORMATION STREAM

This non-provisional U.S. patent application, filed under 35 U.S.C. 111(a) claims, under 35 U.S.C. §119(e)(1), the benefit of the filing date of provisional U.S. application no. 60/053,747 filed under 35 U.S.C. §111(b) on Jul. 25, 1997.

This invention was made with U.S. government support under contract number 70NANB5H1174. The U.S. Government has certain rights in this invention.

The invention relates to communications systems generally and, more particularly, the invention relates to information distribution systems delivering one or more a relatively low bandwidth information streams as information sub-streams of a relatively high bandwidth information stream.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

MPEG and MPEG-like information streams may be spliced together in a relatively seamless manner by defining "In Points" and "Out Points" for each stream that are indicative of, respectively, appropriate stream entry and exit points. An MPEG-like information stream that contains such In Points and Out Points is said to be spliceable. The Society of Motion Picture and Television Engineers (SMPTE) has proposed a standard SMPTE 312M defining such splicing points entitled "Splice Points for MPEG-2 Transport Streams," which is incorporated herein be reference in its entirety.

Many information providers, such as television studios, continue to make substantial investments in equipment conforming to a serial digital interface defined in SMPTE standard 259M. The SMPTE 259 interface was originally developed to carry PAL and NTSC-format digital video in a particular uncompressed form and with a sampling rate of exactly 27.000 MHz. To help preserve this investment, a standard is emerging within SMPTE to carry other forms of video and audio over SMPTE 259. This emerging standard is often referred to as the Serial Data Transport Interface (SDTI) standard or SMPTE 305M. The SMPTE 259 standard and proposed SMPTE 305M standard are incorporated herein by reference in their entireties.

The proposed SMPTE 305M standard specifies a data stream used to transport packetized data, such as MPEG-like data, within a television studio or production center environment in a manner compatible with SMPTE 259. Thus, relatively low bitrate MPEG streams (e.g., 30 Mbps) may be transported within a studio environment as a sub-stream of a relatively high bitrate SDTI stream (e.g., 270 Mbps or 360 Mbps). =p Unfortunately, the SMPTE 305M standard does not provide a solution to the problem of sub-stream splicing. Specifically, to seamlessly splice an MPEG stream carried in an SDTI stream, the MPEG stream must be removed from the SDTI stream, spliced with another MPEG stream (possibly within a respective SDTI stream) and inserted back into an SDTI stream. This is because typical switching equipment switches or edits SMPTE 259 streams only at frame boundaries.

Therefore, it is seen to be desirable to provide a method and apparatus that allows seamless splicing of MPEG information streams carried within SDTI streams. More generally, it is seen to be desirable to provide a method and apparatus that allows seamless splicing of any frame delineated or segmented information stream carried as a sub-stream within a relatively higher bitrate, frame delineated or segmented information stream.

SUMMARY OF THE INVENTION

The invention provides a low cost method and concomitant apparatus for incorporating one or more relatively low bitrate information streams (e.g., MPEG) into a relatively high bitrate information stream (e.g., SDTI) in a manner aligning low bitrate sub-stream splice entrance points and splice exit points within the frame boundaries of the high bitrate information stream. In this manner the splicing of the relatively high bitrate information stream at appropriate In Frames and Ouit Frames will provide relatively seamless splicing of information sub-streams.

Specifically, a method according to the invention for packaging a first framed information stream having a first bitrate into a second framed information stream having a second bitrate, the second bitrate being greater than the first bitrate, the first information stream including stream entrance points and stream exit points, the method comprises the steps of: (a) storing, in a buffer, a portion of the first information stream beginning with a stream entrance point; (b) retrieving, in response to a control signal indicative of the start of an information frame within the second information stream, the stored portion of the first information stream; (c) storing, in a payload portion of one or more information frames associated with the second information stream, the retrieved portion of the first information stream; (d) indicating, via a predetermined syntax, each information frame of the second information stream having payload portion including an initial stream entrance point; and repeating steps (a) through (d) for successive portions of the first information stream.

BRIEF DESCRIPTION OF THE DRAWINGS

The teachings of the present invention can be readily understood by considering the following detailed description in conjunction with the accompanying drawings, in which:

FIG. 6(600B) depicts a flow diagram of a framing routine according to the invention and suitable for use in the SDTI bitstream packaging apparatus of FIG. 4;

FIG. 7A is a high level block diagram of an SDTI bitstream switching apparatus suitable for switching between SDTI bitstreams having a data structure according to FIG. 3;

FIG. 7B is a high level block diagram of an SDTI bitstream switching apparatus suitable for switching between SDTI bitstreams having a data structure according to FIG. 2 or FIG. 3;

FIG. 8A depicts a flow diagram of a buffer write routine according to the invention and suitable for use in the SDTI bitstream packaging apparatus of FIG. 4 and the controller of FIG. 5.

To facilitate understanding, identical reference numerals have been used, where possible, to designate identical elements that are common to the figures.

DETAILED DESCRIPTION

After considering the following description, those skilled in the art will clearly realize that the teachings of the invention can be readily utilized in any information processing system in which a frame delineated information stream is carried as a sub-stream within a relatively higher bitrate, frame delineated information stream. The invention has particular applicability to frame delineated information sub-streams having defined splicing points, such as MPEG-like in points and out points.

An embodiment of the invention will be described within the context of a bitstream packaging method and concomitant apparatus that packages an MPEG transport stream into an SDTI bitstream. However, the scope and teachings of the invention have much broader applicability and, therefore, the invention should not be construed as being limited to the disclosed embodiments.

Figure 1:
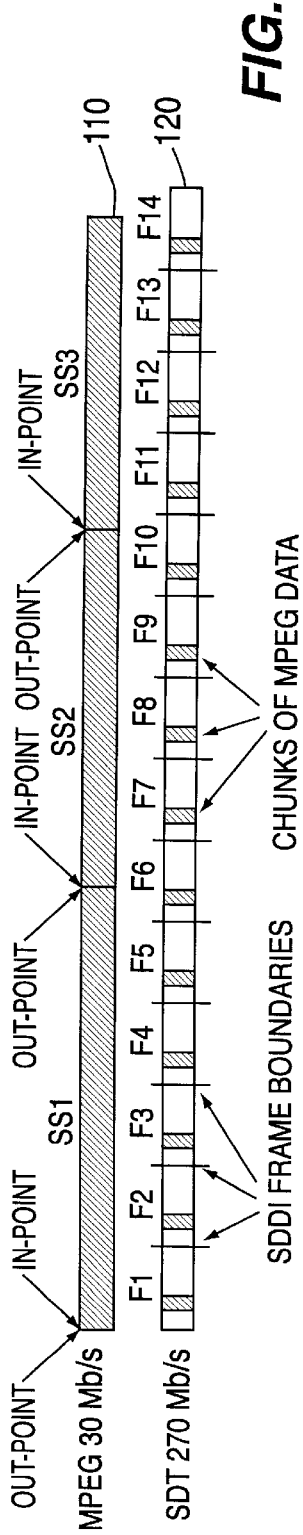
FIG. 1 depicts a prior art arrangement of carrying an MPEG data stream within an SDTI data stream.

FIG. 1 depicts a prior art serial data transport (SDTI) bitstream data structure carrying an MPEG information sub-stream. The top row of FIG. 1 depicts three splicing segments SS1–SS3 of a 30 Mbps MPEG transport stream 110. Each splicing segment begins with an In Point and ends with an out point. The bottom row of FIG. 1 depicts a resulting 270 Mbps SDTI bitstream 120 formed using prior art techniques. Specifically, the MPEG data from the three splicing segments SS1–SS3 of MPEG transport stream 110 is distributed as "chunks" of data comprising ones or more MPEG frames over, illustratively, 14 frames F1–F14 of the SDTI bitstream 120. Since the MPEG data is merely distributed throughout the available SDTI frames, the installed base of SDTI routing switchers (and other switching equipment performing switching operations at SDTI frame boundaries) will produce switched or spliced SDTI bitstreams including discontinuous, or non-seamless MPEG substreams. It should be noted that the "chunks" of data do not need to be evenly distributed or of similar size to utilize the teachings of the present invention.

The present invention aligns an information sub-stream, such as an MPEG transport stream or elementary stream within, illustratively, an SDTI stream. The information sub-stream is carried in a payload portion of an SDTI information frame. The information sub-stream may comprise any type of information stream, though the invention has particular applicability to framed information streams. The present incorporates one or more sub-stream information frames within a single SDTI frame. Each sub-stream information frame may be associated with an appropriate splicing entrance point (e.g., an In Point), an appropriate splicing exit point (e.g., an Out Point) or neither.

Within the context of MPEG sub-streams, an SDTI Out Frame is defined as a data frame that contains MPEG data including a terminating Out Point. The terminating Out Point is located in a terminal or terminating position of the payload portion of the SDT frame. That is, an SDTI Out Frame does not contain any sub-stream data after the last Out Point. Within the context of MPEG sub-streams, an SDTI In Frame is defined as a data frame that contains MPEG data including an initial In Point. That is, an SDTI In Frame does not contain any sub-stream data before the first In Point. Within the context of MPEG sub-streams, an SDTI In/Out Frame is defined as a data frame that contains MPEG data including an initial In Point and a terminating Out Point. That is, an SDTI In/Out Frame does not contain any sub-stream data after the last Out Point or before the first In Point. Thus, an SDTI In/Out Frame comprises an In Point, followed by some sub-stream data (possibly including several In Points and Out Points), followed by a terminating Out Point. Within the context of MPEG sub-streams, an example SDTI In/Out Frame may comprise, illustratively, an entire MPEG group of pictures (GOP).

The terminating or terminal position described above is not necessarily the last possible memory or storage location within the payload of an SDTI stream. Rather, the terminating or terminal position is simply the last position within the payload portion that is utilized to store information associated with a particular sub-stream. In the case of a plurality of unique sub-streams, a payload portion is said to include several terminal or terminating positions, one for each respective unique sub-stream. Similarly, an initial position is not necessarily the first possible memory or storage location within the payload of an SDTI stream. Rather, the initial position is simply the first position within the payload portion that is utilized to store information associated with a particular sub-stream. In the case of a plurality of unique sub-streams, a payload portion is said to include several initial positions, one for each respective unique sub-stream.

Figure 2:
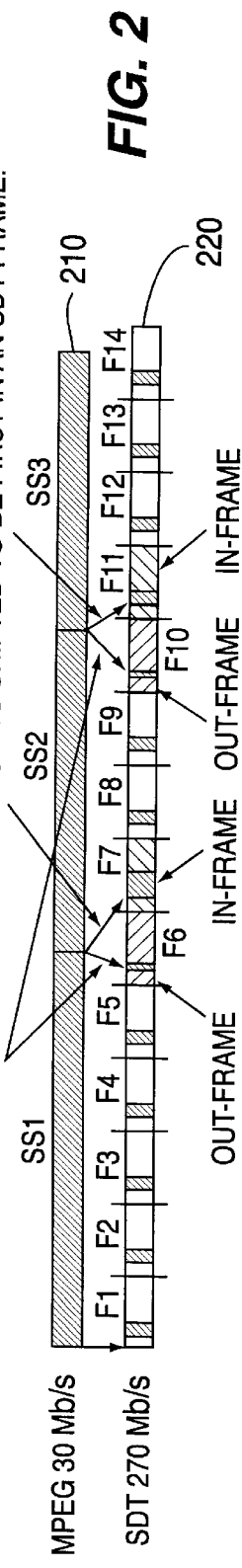
FIG. 2 depicts a serial data transport (SDTI) bitstream data structure carrying an MPEG information sub-stream according to an embodiment of the invention.

FIG. 2 depicts a serial data transport (SDTI) bitstream data structure carrying an MPEG information sub-stream according to an embodiment of the invention. The top row of FIG. 2 depicts three splicing segments SS1–SS3 of a 30 Mbps MPEG transport stream 210. The bottom row of FIG. 1 depicts a resulting 270 Mbps SDTI bitstream 220 formed according to the present invention.

Specifically, with respect to the boundary of the first SS1 and second SS2 splicing segments of the MPEG data stream 210, the Out Point of SS1 of is included within frame F6 of the SDTI data stream 220, while the In Point of SS2 is included within frame F7 of the SDTI data stream 220. With respect to the boundary of the second SS2 and third SS3 splicing segments of the MPEG data stream 210, the Out Point of SS2 of is included within frame F10 of the SDTI data stream 220, while the In Point of SS3 is included within frame F11 of the SDTI data stream 220.

To ensure that frames F6 and F10 of the SDTI data stream 220 are Out Frames, there is no additional data stored in frames F6 or F10 after the Out Points of, respectively, SS1 and SS2. Similarly, to ensure that frames F7 and F11 of the SDTI data stream 220 are In Frames, there is no additional data stored in frames F6 or F11 before the In Points of, respectively, SS2 and SS3.

The SDTI bitstream data structure of FIG. 2 will allow seamless switching and editing provided that a bitstream switcher or editor knows the particular frame at which to switch or edit. That is, for a bitstream switcher to switch from a "first selected" SDTI stream to a "next selected" SDTI stream in a seamless manner (with respect to the sub-stream), the bitstream switcher must identify the Out Frabitstream next selected SDTI bitstream and the In Frame of the next selected bitstream. The resulting switched SDTI bitstream comprises the first selected bitstream of to the identified Out Frame followed by the In Frame of the next selected bitstream and the subsequent next selected information frame. In this manner, the information sub-streams will be aligned at the appropriate In Points and Out Points when extracted from the resulting switched SDTI bitstream. Splice Frame indication will be described in more detail below with respect to Table 1. To properly synchronize substreams to be spliced, a temporal alignment may also be required. Those skilled in the art will recognize that several known methods exist for the appropriate buffering of sub-streams or SDTI streams to be spliced.

Figure 3:
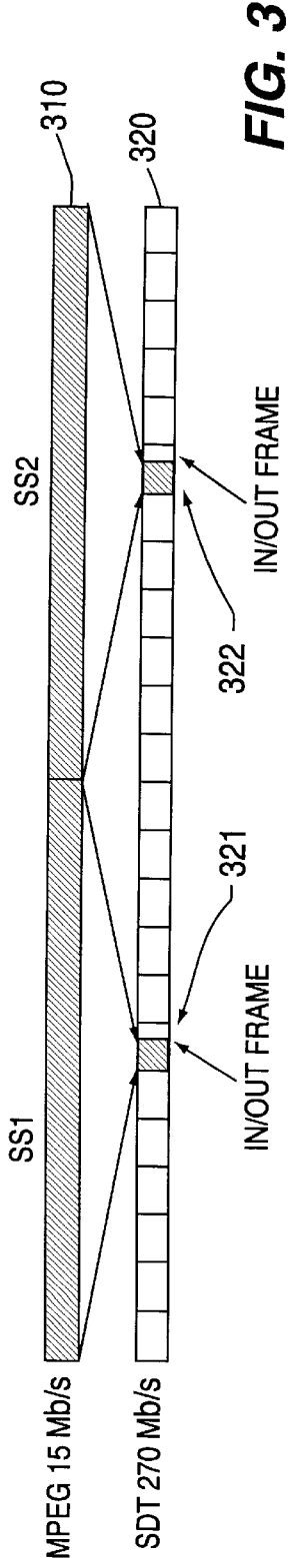
FIG. 3 depicts a SDTI bitstream data structure carrying a constrained MPEG information sub-stream according to an embodiment of the invention.

FIG. 3 depicts a SDTI bitstream data structure carrying a constrained MPEG information sub-stream according to an embodiment of the invention. The top row 310 of FIG. 3 depicts two splicing segments SS1–SS2 of a 15 Mbps MPEG transport stream 310. The bottom row of FIG. 3 depicts a resulting 270 Mbps SDTI bitstream 320 formed according to the present invention.

Specifically, since each of the two splicing segments comprise an In Point followed by some data and a terminating Out Point (e.g., an MPEG-like GOP), each may be used to construct an SDTI In/Out Frame as previously discussed. Thus, the entirety of SS1 is incorporated into an SDTI frame 321 and the entirety of SS2 is incorporated into an SDTI frame 322. It must be noted that the payload portion of each In/Out Frame includes only the In Point, data and Out Point of the respective splice segment or GOP.

The SDTI bitstream data structure of FIG. 3 will allow seamless switching and editing even if a bitstream switcher or editor does not know the particular frame at which to switch or edit. That is, since any SDTI frame boundary separates one sub-stream Out Point from the next sub-stream In Point, the SDTI bitstream switcher may switch at any SDTI frame boundary and still produce a resultant stream that includes an Out Point from a first selected stream followed by an In Point from a next selected stream. Such flexibility is gained at the expense of constraining the information sub-stream to splicing segments that will fit within a single SDTI frame.

In one embodiment of the invention, portions of multiple sub-streams are included within a single SDTI frame. This is possible where the bandwidth or data carrying capacity of the SDTI stream exceeds the sum of the bandwidth or data carrying capacities of the multiple included sub-streams. For example, on a bandwidth availability basis, it is possible to carry several 30 Mbps MPEG streams within a single 270 Mbps or 360 Mbps SDTI stream.

Each included sub-stream within an SDTI stream is associated with a unique identifier such that a particular included sub-stream may be examined by, e.g., a "splice aware" switch or other receiving device. Moreover, to the extent that SDTI frames are classified as In Frames, Out Frames and In/Out frames, these classifications are readily adapted to multiple sub-stream alignments. Thus, an In Frame for a first included sub-stream may be, e.g., an Out Frame for a second included sub-stream. Alternatively, if the included sub-streams have sufficiently similar In Point and Out Point locations (e.g., similar GOP structures), then the included sub-streams may be mutually aligned prior to inclusion in the SDTI stream.

Figure 4:
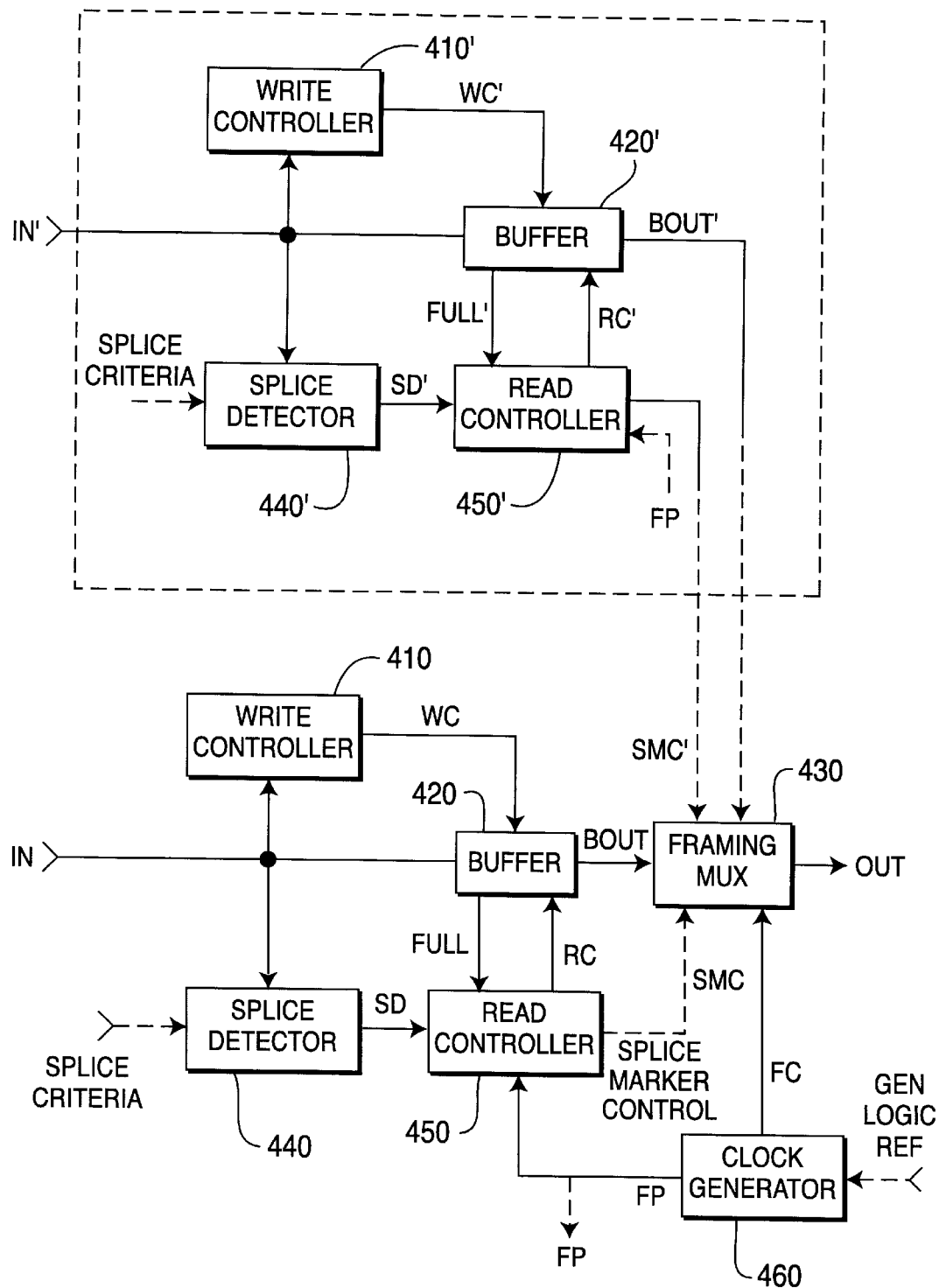
FIG. 4 is a high level block diagram of an SDTI bitstream packaging apparatus according to the invention and suitable for producing the SDTI bitstream data structure of FIG. 2 and FIG. 3.

FIG. 4 depicts a bitstream packaging apparatus 400 according to the invention. The bitstream packaging apparatus 400 receives an input bitstream IN, illustratively an MPEG transport stream including splice point indicia as described above with respect to Table 1 and the SMPTE 312M proposed standard. The bitstream packaging apparatus 400 produces a framed output bitstream OUT, illustratively a SMPTE-259 compliant bitstream incorporating the input bitstream IN in a manner such as that described above with respect to FIG. 2 (i.e., SDTI In Frames and Out Frames). If the input bitstream includes splicing segments (e.g., MPEG-like GOPs or segments) or similar data structures that are small enough to fit inside a single SDTI frame, then the output bitstream may incorporate the input bitstream IN in a manner such as that described above with respect to FIG. 3 (i.e., SDTI In/Out Frames). In either case, the bitstream packaging apparatus 400 wraps SDTI information frames around input bitstream data such that input bitstream Out Points are not followed by input bitstream data in the same SDTI frame, and input bitstream In Points are not preceded by input bitstream data in the same SDTI frame.

The bitstream packaging apparatus 400 of FIG. 4 comprises a write controller 410, a buffer 420, a framing multiplexer 430, a splice detector 440, a read controller 450 and a clock generator 460. The bitstream packaging apparatus 400 of FIG. 4 optionally comprises a second write controller 410', a second buffer 420', a second splice detector 440' and a second read controller 450'.

The input bitstream IN is coupled to the write controller 410, the buffer 420, and the splice detector 440. Write controller 410 produces a write control signal WC indicative of the presence of a valid input bitstream IN, illustratively an MPEG transport stream including splice In Points and splice Out Points.

Buffer 420, illustratively a first-in first-out (FIFO) memory, is coupled to receive the input bitstream IN and, in response to the write control signal WC produced by the write controller 410, begins storing the input bitstream IN. Buffer 420, in response to a read control signal RC produced by the read controller 450, begins retrieving the stored input stream IN to produce a buffer output bitstream BOUT. The buffer output stream BOUT is coupled to framing multiplexer 430. Buffer 420 produces a buffer full signal FULL indicative of an overutilization condition within the buffer, such as memory utilization beyond a predetermined level.

Splice detector 440 monitors the input bitstream IN to identify appropriate splicing points within the input bitstream IN. For example, in the case of an MPEG transport stream, the splice detector 440 may be used to detect splice point indicia such as described above with respect to Table 1 and the SMPTE 312M proposed standard. The splice detector 440 is optionally responsive to a signal SPLICE CRITERIA from an external source (not shown), such as a controller. The criteria defines parameters by which the splice detector may identify In Points and Out Points in a transport stream, elementary stream or packetized elementary stream (PES). That is, the splice detector may be used identify In Points and Out Points within the elementary stream (or PES) by monitoring various stream parameters and system parameters, such as those in proposed standard SMPTE 312M. In response to the detection or determination of a splice point, illustratively an MPEG In Point or Out Point, splice detector 440 produces a splice detection signal SD that is coupled to read controller 450.

With respect to In Point and Out Point determination parameters, the first information frame (e.g., video access unit) at an In Point of an MPEG video splicing segment (SS) must be an I-Frame. The second frame should not reference information frames prior to the In Point (i.e., if the second frame is a B-frame, the B-frame should not reference frames prior to the I-frame). The last frame before an Out Point should not be a B-frame (in display order. There may be other constraints placed on the stream to address issues of, e.g., coding error-build-up, tuning time and minimum picture quality. The identification and use of In Points and Out Points in a splicing arrangement are discussed in more detail in U.S. patent application Ser. No. 08/996,871, filed Dec. 23, 1997 (Attorney Docket 12186A), incorporated herein by reference in its entirety.

Read controller 450, in response to a frame pulse signal FP produced by the clock generator 460 and the splice detection signal SD produced by the splice detector 440, controls the transfer of data from the buffer 420 to the framing multiplexer 430. The splice detection signal SD indicates whether a particular information frame being stored in the buffer 420 comprises an spliceable frame, such as a frame comprising an In Point or an Out Point.

The frame pulse signal FP is used to delineate a period of time representing the temporal dimension of an SDTI information frame. Thus, the framing pulse signal FP indicates that a new SDTI frame is being formed in the framing multiplexer 430. As previously discussed, if the buffer 420 then transmits an In Point to the framing multiplexer 430, the resulting frame will comprise an SDTI In Frame. If the SDTI frame is sufficiently large to include the In Point and all the information frames up to and including an Out Point, then the SDTI frame will comprise an In/Out Frame.

The operation of read controller 450 will be described in more detail below with respect to FIGS. 5 and 6. Briefly, the read controller 450 operates to cause buffer 420 to store, e.g., a portion of a splicing segment, an entire splicing segment or a plurality of splicing segments prior to transmitting the splicing segment(s) to the framing multiplexer 430 as the buffer output stream BOUT. That is, buffer 420 will begin to fill when write controller 410 indicates that the input bitstream IN is a valid bitstream.

The read controller 450 optionally counts the number of framing pulses (FP) received from the clock generator. By counting the number of framing pulses between, e.g., successive In Frames or successive Out Frames, the read controller 450 can determine if the SDTI stream being formed has an appropriate amount In Frames and Out Frames. That is, the read controller 450 optionally monitors the "frame distance" between successive In Frames or successive Out Frames. If i he frame distance exceeds a threshold level, then the read controller 450 adapts the buffer read process to cause the formation of an In Frame or an Out Frame.

In another embodiment of the invention, the buffer 420 is continuously filled by the input stream IN, illustratively an continuously received MPEG transport stream. Thus, the buffer utilization must be carefully managed to ensure that SDTI frames are appropriately formed without losing data due to, e.g., a buffer overflow condition. A bit level approach to such buffer management is discussed in more detail below with respect to FIGS. 8A and 8B.

In response to the splice detection signal SD indicating that an In Point has been detected, read controller 450 causes output from the buffer 420 to stop immediately prior to the In Point (i.e., the In Point is stored in the output position of a FIFO memory). Information frames following the In Point are stored in the buffer 420 in memory locations following the In Point memory location.

In response to a framing pulse FP indicating that a new SDTI frame is being formed, read controller 450 causes buffer 420 to begin transmitting the stored information frames, starting with the In Point and continuing until an Out Point is reached. Read controller 450 causes buffer 420 to stop transmitting stored information frames immediately upon the transmission of an Out Point. Thus, by beginning transmission at an In Point, the SDTI frame receiving the In Point becomes an In Frame. Similarly, by terminating transmission at an Out Point, the SDTI frame receiving the Out Point becomes an Out Frame. In the case of an SDTI frame receiving both an In Point and an Out Point, the SDTI frame becomes an In/Out Frame.

Read controller 450 controls the retrieval and transmission operations of buffer 420 via the read control signal RC. It must be noted that in response to overutilization of buffer 420, as indicated by the buffer fullness signal FULL, read controller 450 will cause the buffer to retrieve and transmit stored information frames at lest until the buffer utilization level is sufficiently reduced. During such an overutilization response period, the alignment of information frames by the framing multiplexer may be incorrect in that In Points may be preceded by data within the same SDTI frame and Out Point may be followed by data within the same SDTI frame. While SDTI information frames formed with such incorrect alignment will not be seamlessly spliceable, the information sub-stream will not have been corrupted. Thus, unless a splice occurs at a misaligned SDTI information frame, the result of the misalignment will not be noticeable.

Read controller 450 produces a splice marker control signal SMC that indicates whether a particular information frame transmitted to the frame multiplexer 430 comprises an In Point or an Out Point. For example, a splicing segment transmitted to the framing multiplexer 430 may comprise an In Point, followed by a number of non-spliceable information frames (possibly including additional In Points) and a terminating Out Point frame. The status of all these frames, or at least the In Point and Out Point frames, is indicated by the splice marker control signal SMC.

Clock generator 460 produces a framing clock signal FC and the frame pulse signal FP. The framing clock signal FC is used as a data clock for the formation and transmission of SDTI information frames. As previously described, the frame pulse signal FP is used to delineate a period of time representing a temporal dimension of an SDTI information frame. Thus, the frame pulse signal FP is used to indicate the start of a new SDTI information frame. The time between each frame pulse signal SD is constant in the case of SDTI information frames, based on the fixed block nature of the SDTI information frame being formed by the frame multiplexer 430. However, in the case of an SDTI-like information stream having a variable length block size, the frame pulse signal may be adapted to indicate such a variable length block size.

In a station or studio environment, it may be desirable to lock the framing clock signal FC and frame pulse signal FP to a studio genlock source. Thus, clock generator 460 optionally receives and locks to such a genlock signal in a known manner (not shown).

Framing multiplexer 430, in response to the framing clock signal FC produced by the clock generator 460, multiplexes the buffer output stream BOUT into a framed output bitstream, illustratively a SMPTE 305 bitstream (i.e., SDTI bitstream) having a data structure as described above with respect to FIGS. 2 or 3. Specifically, the framing multiplexer 430 generates a stream of SDTI information frames at a rate determined by the framing clock signal FC. Each of the SDTI information frames has a header portion and a payload portion. If the buffer 420 transmits data during the formation of an SDTI frame, the framing multiplexer 430 incorporates that data into the payload portion of the SDTI frame being formed.

The header portion of an SDTI frame being formed is optionally adjusted in response to the splice marker control signal SMC, which indicates whether a particular information frame provided by the buffer 420 comprises an In Point or an Out Point. If the first information frame stored in the payload portion of an SDTI frame comprises an In point, as indicated by the splice marker control signal SMC, then the SDTI frame is an In Frame. If the last information frame stored in the payload portion of an SDTI frame comprises an Out point, as indicated by the splice marker control signal SMC, then the SDTI frame is an Out Frame. If the first information frame stored in the payload portion of an SDTI frame comprises an In point and the last information frame stored in the payload portion of the SDTI frame comprises an Out point, then the SDTI frame is an In/Out Frame. The framing multiplexer optionally indicates that a particular SDTI frame is an In Frame, Out Frame or In/Out Frame using one of several techniques, which will now be described.

To properly splice or switch an SDTI bitstream, it is desirable to provide splice point indicative syntax within the SDTI bitstream so that the SDTI splicing or switching device may splice or switch the SDTI bitstream at the appropriate point. As previously discussed, an "In Frame" means that the first part of the sub-stream data contained in the frame is an In Point; an "Out Frame" means that the last part of the sub-stream data contained in the frame is an Out Point; and an "In/Out Frame" means that both the first part of the sub-stream data contained in the frame is an In Point and the last part of the sub-stream data contained in the frame is an Out Point.

The SMPTE 305M provides for an SDTI bitsitream that supports the transport of many forms of user data, including user data comprising fixed block sizes or variable block sizes. Therefore, the SDTI syntax indicative of splice points may be accommodated at several levels, depending upon the type of user data being transported. Specifically, SDTI splice point syntax may be included in the SDTI header, as a new SDTI Data Type, or as an attribute of the User Data Fixed block segment or User Data Variable Block segment.

In one embodiment of the invention, SDTI spliced points are indicated to a SMPTE 259 switch by incorporating SDTI splice point indicative syntax in the header portion of SDTI information frames. Specifically, syntax within the header portion of each SDTI frame is used to indicate if the respective frame is an In Frame, an Out Frame or an In/Out Frame. Moreover, additional syntax is optionally utilized to indicate, e.g., a splice coding delay required for seamless splicing of the SDTI bitstream. In this embodiment, In Frames and Out Frames are indicated to a SMPTE 259 switch by utilizing the first byte of the five byte Header expansion reserved data field a splice_point_marker byte. The splice_point_marker byte is examined by an SDTI splicing or switching device prior to splicing or switching the SDTI stream. Table 1 depicts an exemplary usage of the splice_point_marker byte. Optionally, the splice_point_marker information is carried in the payload portion of an SDTI frame.

TABLE 1

| splice_point_marker | Meaning |
| --- | --- |
| 0x00 | Frame not spliceable |
| 0x01 | In Frame, 90 ms splice_decoding_delay |
| 0x02 | Out Frame, 90 ms splice_decoding_delay |
| 0x03 | In/Out Frame, 90 ms splice_decoding_delay |
| 0x04 | In Frame, 250 ms splice_decoding_delay |
| 0x05 | Out Frame, 250 ms splice_decoding_delay |
| 0x06 | In/Out Frame, 250 ms splice_decoding_delay |
| 0x00 | Frame not spliceable |
| 0x07 | In Frame, unspecified splice_decoding_delay |
| 0x08 | Out Frame, unspecified splice_decoding_delay |
| 0x09 | In/Out Frame, unspecified splice_decoding_delay |
| 0x0a to 0xFF | Reserved |

In another embodiment of the invention, SDTI splice points are indicated to a SMPTE 259/305 switch by the use of a new data type within the SDTI Data Type Syntax. For example, a first Data Type code (e.g., 253 h) may be used to indicate that an information sub-stream comprises an MPEG-2 transport stream. A second Data Type code (e.g., 263 h) may be used to indicate that an information sub-stream comprises an MPEG-2 transport stream and that the particular SDTI frame comprises an In Frame. A third Data Type code (e.g., 264 h) may be used to indicate that an information sub-stream comprises an MPEG-2 transport stream and that the particular SDTI frame comprises an Out Frame. This approach of simultaneously indicating information sub-stream data type and SDTI frame type may be readily adapted to all other compressed and uncompressed data representations carried in an SDTI bitstream.

In another embodiment of the invention, SDTI splice points are indicated to a SMPTE 259/305 switch by modifying the interpretation of the User Data Formats for Fixed or Variable Blocks. The new Data Type Syntax utilizes an additional field immediately following the Type code in the User Data Fixed/Variable Blocks. A splice point is indicated to a SMPTE 259/305 switch by defining such a byte as shown previously.

The relatively high bitrate framed information stream, illustratively an SDTI stream, is used to package one or more relatively low bitrate framed information streams, illustratively one or more MPEG transport and/or elementary streams. The packaging process optionally forms SDTI frames including one or more MPEG information frames. Specifically, an SDTI frame may include a single MPEG frame, a plurality of MPEG frames comprising a single group of pictures (GOP) or any number of frames depending upon the relative sizes of the SDTI and MPEG frames.

For the purpose of easing subsequent splicing of the resulting SDTI stream, it is important to form SDTI In Frames and Out Frames at a regular interval. Thus, in one embodiment of the invention, after a predetermined number of SDTI frames have been formed without the formation of an Out Frame, retrieval of information from the buffer is halted immediately after the next Out Point within the relatively low bitrate information stream is sent to the framing multiplexer. Upon receiving the next framing pulse, buffer retrieval is resumed. In this manner, that last Out Point causes the formation of an Out Frame since it will be the last sub-stream information component stored in the payload portion of the SDTI frame (i.e., the "terminal" payload frame). Ideally, the Out Point used to form the Out Frame is followed by an In Point. However, since the purpose of forming the Out Frame is to leave a stream at an appropriate point, the frames immediately following the Out Frame are probably not used anyway.

Similarly, after a predetermined number of SDTI frames have been formed without the formation of an In Frame, retrieval of information from the buffer is halted immediately before the next In Point within the relatively low bitrate information stream is sent to the framing multiplexer. Upon receiving the next framing pulse, buffer retrieval is resumed. Thus, the In Point will be the first frame stored in the pay,load portion of the SDTI frame (i.e., the "initial" payload frame). In this manner, that In Point will cause the formation of an In Frame. Ideally, the In Point used to form the Out Frame is preceded by an Out Point. However, since the purpose of forming the In Frame is to enter a stream at an appropriate point, the frames immediately preceding the In Frame are probably not used anyway.

The predetermined number of frames between Out Frame or In Frames is determined with respect to the particular splicing application. For example, in a studio switching or routing application a great deal of control may be desired such that frequent In Frames and Out Frames are necessary. In a less demanding application, fewer In Frames and Out Frames are necessary. The predetermined number of frames may be calculated with respect to the frame rate of the relatively high bitrate information stream used and the maximum time allowed to implement a stream switch or splice operation.

Referring now to a multiple input stream embodiment of the invention. FIG. 4 discloses optional second write controller 410', second buffer 420', second splice detector 440' and second read controller 450' operate in substantially the same manner as previously described with respect to the write controller 410, buffer 420, splice detector 440 and read controller 450. The purpose of these optional components is to package a second input signal IN' along with the first input signal IN.

In this embodiment each input stream IN and IN' includes a unique identification indicium, such as a stream id (SID) or program id (PID) code. The stream id is usually located in a header portion of the stream, though the exact type and location of the id is not critical. Regardless of the stream id scheme used, framing multiplexer 430 utilizes the id to package the first buffer output bitstream BOUT and the second buffer output bitstream BOUT'. Moreover, as previously discussed, multiple stream packaging results in a plurality of In Frame, Out Frame and In/Out Frame depending upon the contents of a particular frame. Specifically, an Out Frame for buffer output bitstream BOUT may actually be an In Frame for buffer output bitstream BOUT'. Additionally, the second splice marker control signal SMC' is used to define information appropriate to the second buffer output bitstream BOUT'. FIG. 5 depicts a controller suitable for use in the bitstream packaging apparatus of FIG. 4. Specifically, FIG. 5 depicts a read controller 450 suitable for use as the read controller 450 of the bitstream packaging apparatus of FIG. 4. Optionally, the read controller 450 of FIG. 5 may additionally perform the functions allocated to the write controller 410 of FIG. 4.

The read controller 450 contains a microprocessor 454 as well as memory 458 for storing a buffer management routine 600A. The microprocessor 454 cooperates with conventional support circuitry 456 such as power supplies, clock circuits, cache memory and the like as well as circuits that assist in executing the software routines. As such, it is contemplated that some of the process steps discussed herein as software processes may be implemented within hardware, e.g., is circuitry that cooperates with the microprocessor 454 to perform various steps. The read controller 450 also contains input/output circuitry 452 that forms an interface between the splice detector 440, buffer 420, framing multiplexer 430 and clock generator 460 of the bitstream packaging apparatus 400 of FIG. 4. Although the read controller 450 is depicted as a general purpose computer that is programmed to perform buffer management functions, and, optionally input stream IN verification functions in accordance with the present invention, the invention can be implemented in hardware as an application specific integrated circuit (ASIC). As such, the process steps described herein are intended to be broadly interpreted as being equivalently performed by software, hardware, or a combination thereof.

The read controller 450 of the present invention executes a buffer management routine 600 that is used to temporally align information frames comprising In Points and Out Points of the input bitstream IN according to the frame pulse signal FP. The buffer management routine 600 causes information frames to be provided to the framing multiplexer 430 in a manner facilitating SDTI packaging of the information frames as an SDTI information sub-stream including appropriate splicing indicia so that subsequent splicing operations may be performed in a seamless manner.

Data interleaving is a known technique used to make a data stream more resistant to "burst errors," which are periods where one or more sequential bits, bytes or other data structures in a sequence of bits, bytes or other data structures are corrupted. A data interleaving algorithm rearranges the bits, bytes or other data structures in a manner that converts a sequence of errors into a plurality of individual errors. The individual errors are more readily corrected using, e.g., forward error correction techniques. Data interleaving is commonly used to store data in storage media prone to sequential errors, such as magnetic tape.

In one embodiment of the invention, interleaved sub-stream data (e.g., MPEG transport or elementary streams stored or. magnetic tape) is further constrained in that no block of data to be interleaved is allowed to contain data from both before and after a given splice point (In Point or Out Point). That is, while portions of a substream delineated by an In Point and Out Point may include interleaved data, the reconstruction of the interleaved data does not require data from outside the delineated portion. In this manner, the relatively seamless splicing of SDTI streams including interleaved sub-streams is achieved.

Figure 5:
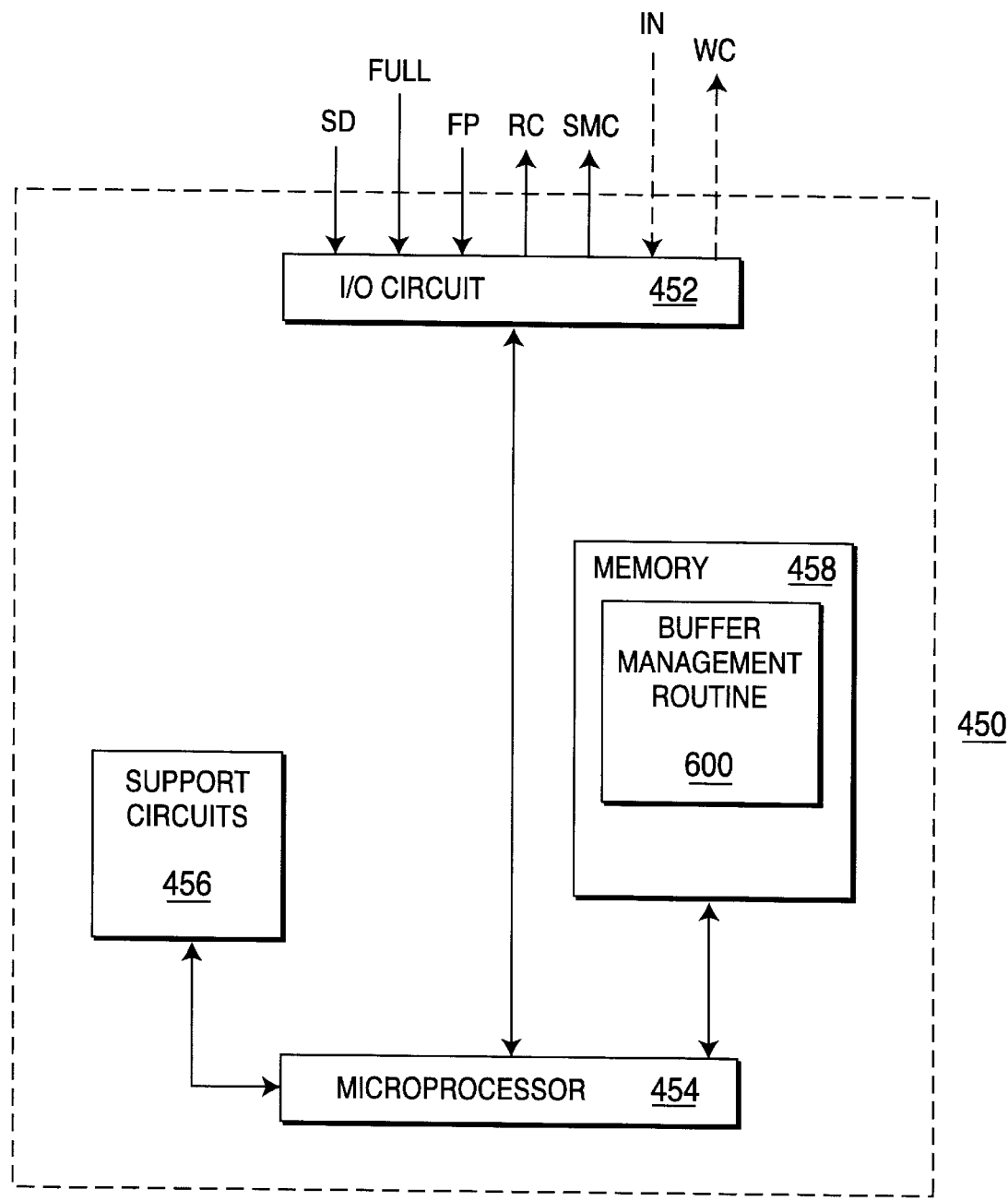
FIG. 5 depicts a controller suitable for use in the bitstream packaging apparatus of FIG. 4.
Figure 6:
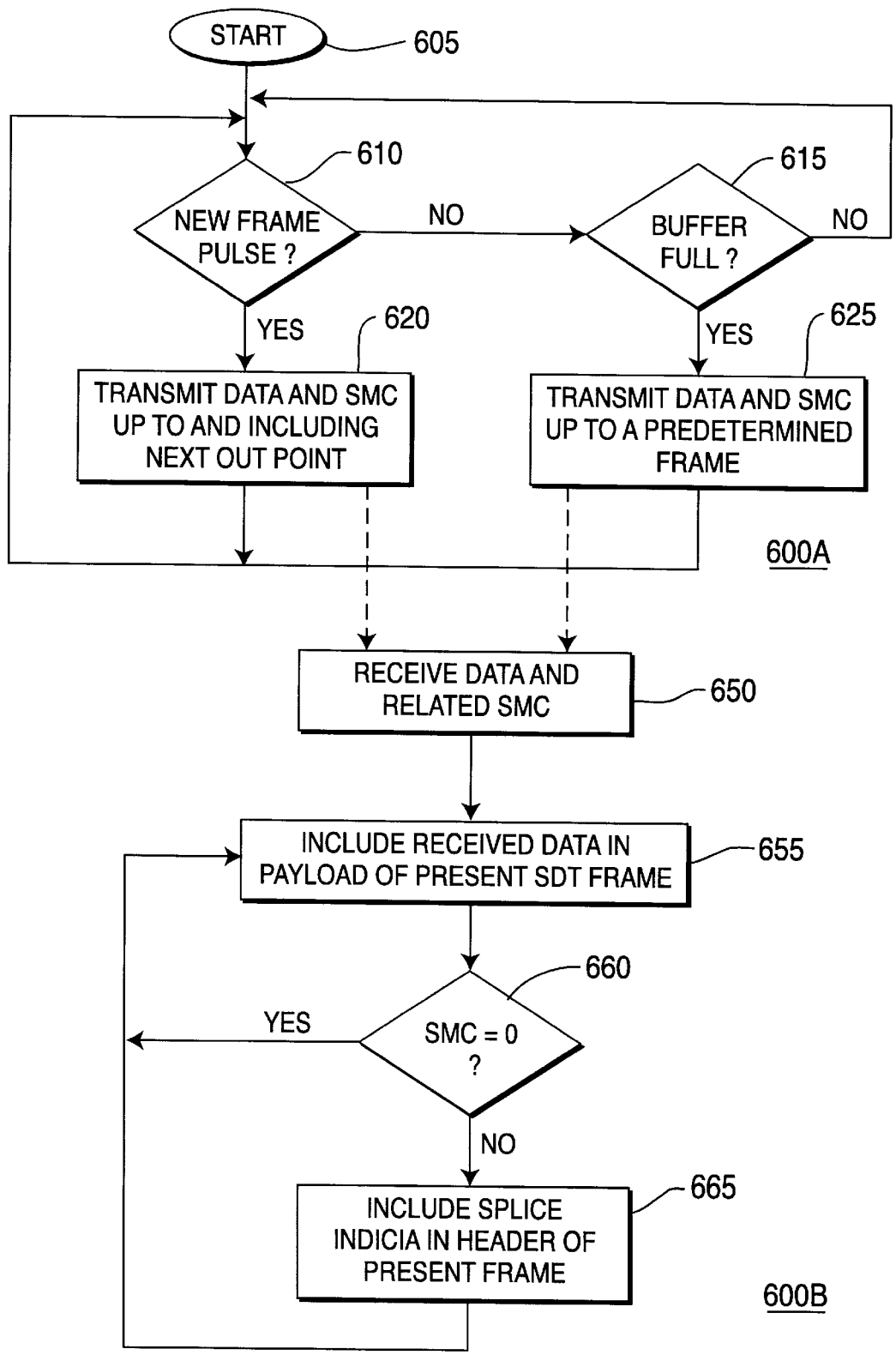
FIG. 6(600A) depicts a flow diagram of a buffer management routine according to the invention and suitable for use in the SDTI bitstream packaging apparatus of FIG. 4 and the controller of FIG. 5.

FIG. 6(600A) depicts a flow diagram of a buffer management routine 600A according to the invention and suitable for use in the SDTI bitstream packaging apparatus of FIG. 4 and the controller of FIG. 5. FIG. 6B depicts a flow diagram of a framing routine 600B according to the invention and suitable for use in the SDTI bitstream packaging apparatus of FIG. 4. The buffer management routine 600A and the framing routine 600B will be described together to show the timing relationships of the respective routines.

Moreover, though not shown explicitly in the flow chart, the buffer 420 is continually receiving data from the input bitstream IN under the control of, e.g., the write controller 410.

The buffer management routine 600A is entered at step 605 and proceeds to step 610, where a query is made as to whether a new frame pulse FP has been received. As previously discussed, the frame pulse FP indicates that a new output frame, e.g., an SDTI information frame, is being formed by the framing multiplexer 430.

If the query at step 610 is answered affirmatively, then the routine 600A proceeds to step 620, where the read controller 450 causes buffer 420 to begin transmitting stored information frames, starting with (ideally) an In Point and continuing until an Out Point is reached. The read controller 450 also provides a splice marker control SMC signal that indicates if a transmitted information frame includes an In Point or an Out Point. The read controller 450 causes buffer 420 to stop transmitting stored information frames immediately upon the transmission of an Out Point. The routine 600A then proceeds to step 610 to wait for a new framing pulse FP. Since an Out Point should be followed by an In Point, the buffer 420 stores the In Point and the information frames following the In Point.

If the query at step 610 is answered negatively, then the routine 600A proceeds to step 615, where a query is made as to whether a buffer overutilization condition exists. If the query at step 615 is answered negatively, then the routine 600A proceeds to step 610. If the query at step 615 is answered affirmatively, then the routine 600A proceeds to step 625, where the read controller 450 causes buffer 420 to begin transmitting stored information frames and the associated splice marker control SMC signal. The read controller 450 causes buffer 420 to stop transmitting stored information frames immediately upon the transmission of an Out Point, or immediately prior to the next In Point or upon transmitting a predetermined number of information frames. The routine 600A then proceeds to step 610 to wait for a new framing pulse IFP.

The frame multiplexer 430 operates according to the framing routine 600B of FIG. 6. Specifically, the frame multiplexer 430 continually forms information frames, e.g., SDTI information frames for response to the framing clock signal FC. Any information frames received from the buffer 420 are incorporated into the payload portion of an SDTI information frame being formed, along with appropriate splicing indicia.

The framing routine 600B is entered at step 650 when, as indicated by the dotted lines from steps 620 and 625, information frames and associated splice marker control SMC signals are received. The routine 600B then proceeds to step 655, where the received information frames are incorporated into the payload portion of an SDTI information frame being formed.

The routine 600B then proceeds to step 660 where a query is made as to whether the splice marker control SMC signal indicates that a received information frame includes an In Point or an Out Point. If the query is answered negatively, then the routine 600B proceeds to step 655.

If the query is answered affirmatively, then the routine 600B proceeds to step 665, where indicia of the In Point or Out Point is included within the SDTI header according to one of the splice indicia syntax rules previously described (e.g., the syntax described in Table 1). The routine 600B then proceeds to step 655.

FIG. 7A is a high level block diagram of an SDTI bitstream switching apparatus 700A suitable for switching between SDTI bitstreams having a data structure according to FIG. 3. Specifically, bitstream switching apparatus 700A comprises a switch controller 710A and a switch 720.

Switch 720 is coupled to receive a first bitstream SDTI A at a first input I1 and a second bitstream SDTI B at a second input I2. Switch 720, in response to a switch control signal C, couples either the first bitstream SDTI A or the second bitstream SDTI B to an output OUT.

Switch controller 710A generates the switch control signal C in response to a switch command signal SC and a frame timing pulse FT. The switch command signal is a signal indicative of a present need to switch bitstreams (e.g., a switch feed signal from a studio control console). The frame timing pulse FT is indicative of a frame boundary (such as an SDTI frame boundary, a vertical timing interval and the like). Thus, switch controller 710A will only cause a switching operation at an appropriate frame boundary.

Bitstream switching apparatus 700A may be defined as a "splice unaware" switching apparatus since it does not utilize any of the previously discussed splice point indicia included in, e.g., the SDTI bitstream, or a sub-stream within the SDTI bitstream or it does not examine the sub-stream to identify splice point indicia or, more generally, suitable sub-stream entrance and exit points. Thus, to guarantee a seamless splicing or switching between information substreams of, e.g., th(e first bitstream SDTI A and the second bitstream SDTI B, it is necessary for these SDTI streams to be constructed using the data structure defined in FIG. 3. Specifically, the first bitstream SDTI A and the second bitstream SDTI B must comprise only In/Out Frames. In this manner a first-selected SDTI stream will always be exited at an information sub-stream Out Point, while a next-selected SDTI stream will always be entered at an information sub-stream In Point.

FIG. 7B is a high level block diagram of an SDTI bitstream switching apparatus 700B suitable for switching between SDTI bitstreams having a data structure according to FIG. 2 or FIG. 3. Specifically, bitstream switching apparatus 700B comprises a switch controller 710B, a switch 720 and a splice detector 730. The switch 720 operates in the same manner as previously described with respect to FIG. 7A.

Splice detector 730 is coupled to receive the first bitstream SDTI A and the second bitstream SDTI B. The splice detector 730 scans the received bitstreams for splicing indicia and produces in output signal S indicative of identified splice point indicia within the bitstreams. Specifically, the splice detector 730 examines the header of each received SDTI frame to determine if In Frame, Out Frame or In/Out Frame syntax or other indicia is present. In an alternate embodiment, the splice detector 730 examines the header of each received SDTI information sub-stream frame to determine if a data type indicative of an In Frame, Out Frame or In/Out Frame is present. In another alternate embodiment, the splice detector 730 examines the header of each received SDTI information sub-stream frame to determine if In Point or Out Point syntax or other indicia is present. For example, in the case of a sub-stream comprising an MPEG-2 transport stream, a splice-aware SMPTE 259 switch examining splice_countdown field within the header portion of an MPEG-2 transport stream frame may readily determine, in a known manner, if a splice at the particular MPEG-2 frame will be seamless.

In addition to indicating the presence of a splice point within one or both of the bitstreams, the splice detector 730 also forwards to the switch controller any identified timing or delay information relating the identified splice points. The splice detector 730 may also be used to examine the bitstream at the elementary stream (or PES) level to identify splicing In Points and/or Out Points. The criteria for such an examination SPLICE CRITERIA may be received from an external source, such as the splice controller (not shown). This results of the examination may also be forwarded to the switch controller.

Switch controller 710B generates the switch control signal C in response to the switch command signal SC, the frame timing pulse FT and the splice detection signal S. If the splice detection signal indicates that a switch or splice operation must be delayed by some number of seconds or frames, such as indicated in the syntax of Table 1, then the switch controller 710B delays switching until the appropriate delay or frame count has occurred.

Bitstream switching apparatus 700B may be defined as a "splice aware" switching apparatus since it utilizes any of the previously discussed splice point indicia include in, e.g., the SDTI bitstream or a sub-stream within the SDTI bitstream. Thus, to guarantee a seamless splicing or switching between information sub-streams of, e.g., the first bitstream SDTI A and the second bitstream SDTI B, it is only necessary for these SDTI streams to be constructed using the data structure defined in FIG. 2, rather than the more constrained data structure defined in FIG. 3.

FIG. 8A depicts a flow diagram of a buffer write routine 800A according to the invention and suitable for use in the SDTI bitstream packaging apparatus of FIG. 4 and the controller of FIG. 5. The routine 800A is entered at step 801 and proceeds to step 802, where a bit from an information sub-stream (such as IN or IN' of FIG. 4) is written into a buffer (such as buffer 420 or 420' of FIG. 4). The routine 800A then proceeds to step 803, where a query is made as to whether the data is indicative of a splice point. If the query at step 803 is answered affirmatively, then the routine 800A proceeds to step 804, where a splice point indicator is set. The routine 800A then proceeds to step 802. If the query at step 803 is answered negatively, then the routine 800A proceeds directly to step 802.

Figure 8B:
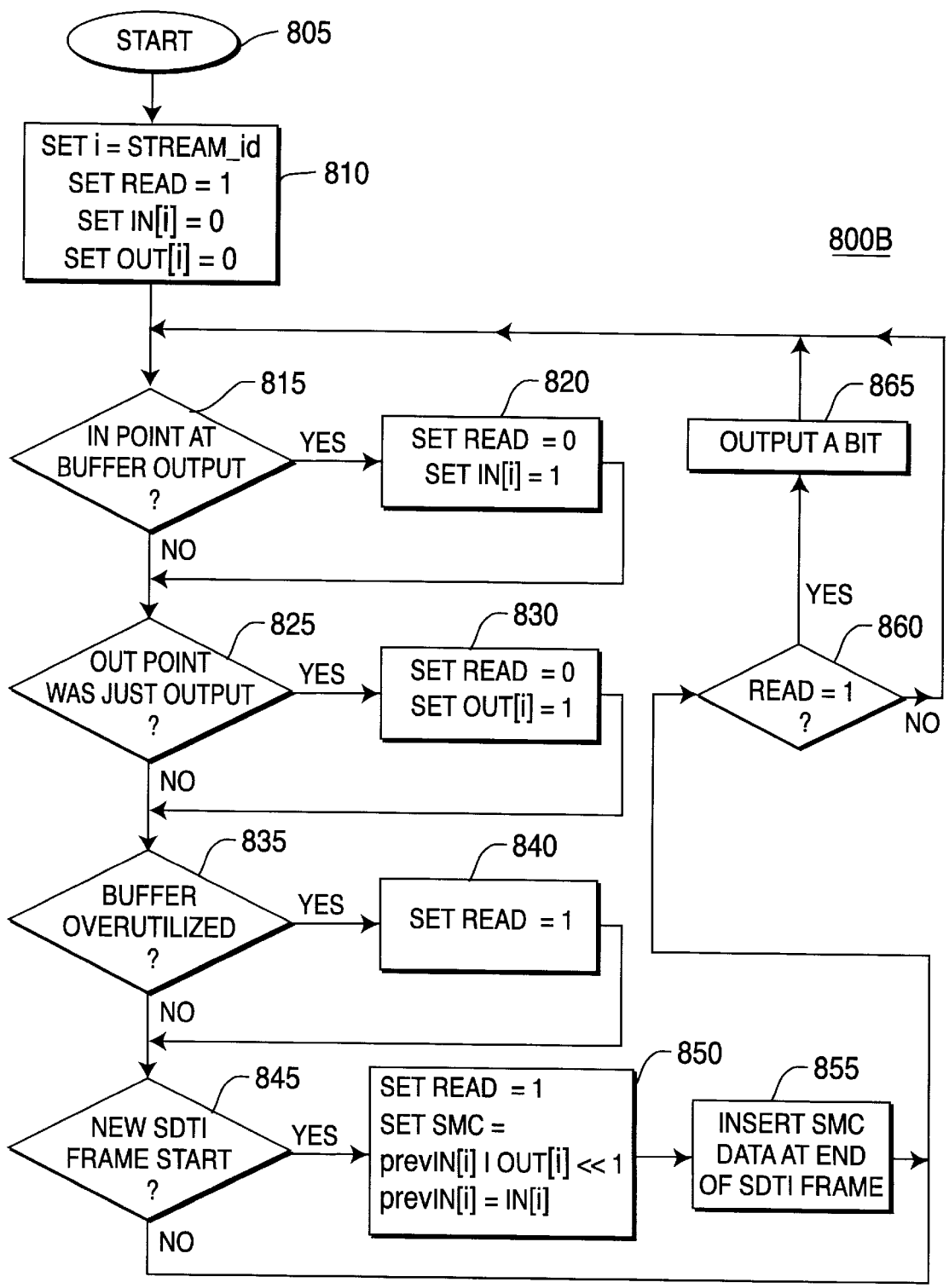
FIG. 8B depicts a flow diagram of a buffer read routine 800B according to the invention and suitable for use in the SDTI bitstream packaging apparatus of FIG. 4 and the controller of FIG. 5.

FIG. 8B depicts a flow diagram of a buffer read routine 800B according to the invention and suitable for use in the SDTI bitstream packaging apparatus of FIG. 4 and the controller of FIG. 5. Specifically, the buffer read routine 800B controls, at a bit level, the data output operation (i.e., read process) of a buffer (such as buffer 420 or 420' of FIG. 4) associated with a particular input stream (such as IN or IN' of FIG. 4). Data is written to the buffer as it becomes available form buffer is normally filled by data The buffer read routine 800B includes within an output bitstream information that indicates to an SDTI frames multiplexer (or packaging unit) which SDTI frames formed with information from the buffer will be In Frames, which will be Out Frames and which will be In/Out Frames. The buffer read routine 800B also adapts the output data flow to buffer overutilization conditions.

The buffer read routine 800B is entered at step 805 and proceeds to step 810, where several variables are initialized. Specifically, a variable ID is set equal to a parameter STREAM_ID; a variable READ is set equal to one; a variable IN[ID] is set equal to zero; and a variable OUT[ID] is set equal to zero. The parameter STREAM_ID is indicative of a stream identification for a particular information stream being processed. For example, in the case of processing multiple information stream, each information stream will be associated with a unique si ream identification, as previously described. The buffer read routine 800B utilizes the ID to manipulate the variables IN[ID] and OUT[ID], which are used to indicate if an SDTI frame being formed will be an In Frame (IN[I]=1), an Out Frame (OUT[I]=1) or an In/Out Frame (IN[I]=OUT[I]=1). In this manner, multiple sub-streams may be packaged within, e.g., a single SDTI stream such that each a single SDTI frame may comprise an In Frame, Out Frame or In/Out Frame as necessary to accommodate each of the packages substreams. This is an extremely useful and efficient method that allows for maximal utilization of the bandwidth in the SDTI stream. The routine 800B then proceeds to step 815.

At step 815, a query is made as to whether an In Point is present at the output of the buffer, e.g., the buffer associated with the sub-stream identified by the variable ID. If the query at step 815 is answered affirmatively, then the routine proceeds to step 820 where the variable READ is set equal to zero, and the variable IN[ID] is set equal to one. The routine 800B then proceeds to step 825. If the query at step 815 is answered negatively, then the routine 800B proceeds directly to step 825.

At step 825, a query is made as to whether an Out Point was just retrieved from the buffer output. If the query at step 825 is answered affirmatively, then the routine proceeds to step 830, where the variable READ is set equal to zero and the OUT, is set equal to one. The routine 800B then proceeds to step 835. If the query at step 825 is answered negatively, then the routine 800B proceeds directly to step 835.

At step 835, a query is made as to whether the buffer, e.g., the buffer associated with the sub-stream identified by the variable ID, is overutilized (i.e., approaching an overflow condition). If the query at step 835 is answered affirmatively, then the routine 800B proceeds to step 840 where the variable READ is set equal to one. The routine 800B then proceeds to step 845. If the query at step 835 is answered negatively, then the routine proceeds directly to step 845.

At step 845, a query is made as to whether a new SDTI frame is starting. The start of a new SDTI frame may be sensed via, e.g., the frame pulse FP condition previously described with respect to SDTI framing unit of FIG. 4. If the query at step 845 is answered affirmatively, then the routine 800B proceeds to step 850, where the READ variable is set equal to one. Additionally, a splice marker control (SMC) flag is set equal to the previous IN[ID] value logically ORed with the present OUT[ID] value and shifted left by one bit position. Additionally, the previous IN[ID] value is set equal to the present IN[ID] variable. The routine 800B then proceeds to step 855, where the splice marker control data is inserted at the end of the SDTI frame presently being formed. The routine 800B then proceeds to step 860. If the query at step 845 is answered negatively, then the routine 800B proceeds directly to step 860.

At step 860, a query is made as to whether the variable READ is equal to one. If the query at step 860 is answered affirmatively, then the routine 800B proceeds to step 865, where the next output bit is read from the buffer. The routine then proceeds to step 815. If the query at step 860 is answered negatively, then the routine proceeds directly to step 815.

With the teaching of the above disclosure, it will now be apparent to one skilled in the art that one or more frame delineated or segmented information streams may be included as a sub-streams within a relatively higher bitrate, frame delineated or segmented information stream. In this manner, high bitrate communications systems and protocols, such as the above-described Serial Data Transport Interface (SDTI) standard SMPTE 259 (and the related SMPTE 305M), may be advantageously utilized to transport relatively low bitrate information streams while preserving an ability to properly splice sub-streams.

Although various embodiments which incorporate the teachings of the present invention have been shown and described in detail herein, those skilled in the art can readily devise many other varied embodiments that still incorporate these teachings.

What is claimed is:

1. A method for packaging a first framed information stream having a first bitrate into a second framed information stream having a second bitrate, said second bitrate being greater than said first bitrate, said first information stream including stream entrance points and stream exit points, said method comprising the steps of:
   (a) storing, in a pay load portion of one or more information frames associated with said second information stream, at least a portion of said first information stream;
   (b) indicating, via a predetermined syntax, each information frame of said second information stream having a payload portion including an initial stream entrance point; and
   repeating steps (a) through (b) for successive portions of said first information stream.

2. The packaging method of claim 1, wherein said step of indicating further comprises the step of:
   indicating, via a predetermined syntax, each information frame of said second information stream having a payload portion including a terminating stream exit point.

3. The packaging method of claim 1, further comprising the steps of:
   counting, beginning with each information frame of said second information stream having payload portion including an initial stream entrance point, the number of information frames of said second information stream started; and
   in the case of said number exceeding a threshold level:
      halting said step of storing immediately prior to the storage of a stream entrance point; and
      resuming said step of storing in response to a control signal indicative of the start of an information frame within said second information stream.

4. The packaging method of claim 2, further comprising the steps of:
   counting, beginning with each information frame of said second information stream having payload portion including a terminating stream exit point, the number of information frames of said second information stream started; and
   in the case of said number exceeding a threshold level:
      halting said step of storing said stored portion of said first information stream immediately after the storage of a stream exit point; and
      resuming said step of storing in response to a control signal indicative of the start of an information frame within said second information stream.

5. The packaging method of claim 1, wherein said step of storing is initiated in response to a control signal indicative of a buffer overutilization condition.

6. The packaging method of claim 1, wherein said first stream includes a stream identifier.

7. The packaging method of claim 1, wherein only a single information frame is stored in the payload portion of an information frame of said second information stream.

8. The packaging method of claim 1, wherein only those information frames associated with a single group of pictures (GOP) are stored in the payload portion of an information frame of said second information stream.

9. A method for packaging a relatively low bitrate framed information stream into a relatively high bitrate framed information stream, said relatively low bitrate framed information stream including stream entrance points and stream exit points, said method comprising the steps of:
   retrieving, from a buffer, said relatively low bitrate information frames;
   storing, in a payload portion of one or more of relatively high bitrate information frames, said retrieved relatively low bitrate information frames; and
   indicating, via a predetermined syntax, each of said relatively high bitrate information frames including, in an initial payload position, a relatively low bitrate information frame comprising a stream entrance point.

10. The method of claim 9, further comprising the step of:
    indicating, via a predetermined syntax, each of said relatively high bitrate information frames including, in a terminal payload position, a relatively low bitrate information frame comprising a stream exit point.

11. The method of claim 9, further comprising the steps of:
    monitoring a frame pulse signal indicative of the start of an information frame in said relatively high bitrate information stream;
    counting, beginning with each relatively high bitrate information frame including a stream entrance point in an initial payload position, the number of relatively high bitrate information frames started; and
    in the case of said number exceeding a threshold level:
       halting said step of retrieving said relatively low bitrate information frames from said buffer immediately prior to the retrieval of a stream entrance point; and
       resuming, in response to a frame pulse signal indicative of the start of a relatively high bitrate information frame, said step of retrieving said relatively low bitrate information frames from said buffer.

12. The method of claim 10, further comprising the steps of:
    monitoring a frame pulse signal indicative of the start of an information frame in said relatively high bitrate information stream;
    counting, beginning with each relatively high bitrate information frame including a stream exit point in an terminal payload position, the number of relatively high bitrate information frames started; and
    in the case of said number exceeding a threshold level:
       halting said step of retrieving said relatively low bitrate information frames from said buffer immediately after the retrieval of a stream exit point; and
    resuming, in response to a frame pulse signal indicative of the start of a relatively high bitrate information frame, said step of retrieving said relatively low bitrate information frames from said buffer.

13. The method of claim 9, wherein:
    said step of storing said retrieved information frames is halted upon retrieving a predetermined number of relatively low bitrate information frames including a stream exit point; and
    said step of storing said retrieved information frames is resumed in response to a control signal indicative of the start of an information frame within said second information stream.

14. The method of claim 9, wherein:

said step of storing said retrieved information frames is halted upon retrieving a predetermined number of relatively low bitrate information frames including a stream entrance point; and said step of storing said retrieved information frames is resumed in response to a control signal indicative of the start of an information frame within said second information stream.

15. A method for packaging a plurality of relatively low bitrate framed information streams into a relatively high bitrate framed information stream, each of said relatively low bitrate framed information streams including a respective stream identifier and one or more stream entrance points and stream exit points, said method comprising the steps of:

retrieving, from respective buffers, at least a portion of each of said relatively low bitrate framed information streams;

storing, in a payload portion of one or more relatively high bitrate information frames of said relatively high bitrate framed information stream, said respective retrieved portions of each of said relatively low bitrate framed information streams, each of said relatively high bitrate information frames comprising one or more relatively low bitrate information frames from one or more of said plurality of relatively low bitrate framed information streams; and indicating, via a predetermined syntax, each of said relatively high bitrate information frames including, in an respective initial payload position, a respective relatively low bitrate information frame comprising a stream entrance point.

16. The method of claim 15, further comprising the step of:

indicating, via a predetermined syntax, each of said relatively high bitrate information frames including, in an respective terminal payload position, a respective relatively low bitrate information frame comprising a stream exit point.

17. The method of claim 15, further comprising the steps of:

monitoring a frame pulse signal indicative of the start of an information frame in said relatively high bitrate information stream;

counting, for each respective relatively low bitrate information stream, beginning with each relatively high bitrate information frame including a respective stream entrance point in an initial payload position, the number of relatively high bitrate information frames started; and in the case of said number exceeding a threshold level for a respective relatively low bitrate information stream:
halting said step of retrieving said portions of said relatively low bitrate information streams immediately prior to the retrieval of a stream entrance point; and resuming, in response to a frame pulse signal indicative of the start of a relatively high bitrate information frame, said step of retrieving said portions of said relatively low bitrate information streams.

18. The method of claim 16, further comprising the steps of:

monitoring a frame pulse signal indicative of the start of an information frame in said relatively high bitrate information stream;

counting, for each respective relatively low bitrate information stream, beginning with each relatively high bitrate information frame including a respective stream exit point in an terminal payload position, the number of relatively high bitrate information frames started; and in the case of said number exceeding a threshold level for a respective relatively low bitrate information stream:
halting said step of retrieving said portions of said relatively low bitrate information streams immediately after the retrieval of a stream exit point; and resuming, in response to a frame pulse signal indicative of the start of a relatively high bitrate information frame, said step of retrieving said portions of said relatively low bitrate information streams.

19. An apparatus for generating a bitstream, comprising:

a buffer, coupled to receive a first input bitstream including entrance points and exit points, for storing said first input bitstream and, in response to a first read control signal, selectively transmitting at least a portion of said stored first input bitstream;

a framing multiplexer, coupled to said buffer and receiving said transmitted portion of said stored first input bitstream, for forming an output bitstream including a plurality of information frames having respective payload portions, said transmitted portion of said stored first input bitstream being distributed among one or more payload portions of respective information frames, said framing multiplexer indicating, via a predetermined syntax, each of said information frames including, in an initial payload position, a stream entrance point; and a read controller, coupled to said buffer, for providing said first read control signal and, in response to a control signal indicative of the formation of an information frame by said framing multiplexer, causing said buffer to transmit a portion of said first stored input stream.

20. The apparatus of claim 19, wherein said framing multiplexer indicates, via a predetermined syntax, each of said information frames including, in a terminal payload position, a stream exit point.

21. The apparatus of claim 19, wherein:

said portion of said first input stream transmitted to said framing multiplexer comprises a portion delineated by an initial entrance point and a terminating exit point.

22. The apparatus of claim 19, wherein:

said portion of said first input stream transmitted to said framing multiplexer comprises an entire group of pictures.

23. The apparatus of claim 19, wherein:

said portion of said first input stream transmitted to said framing multiplexer comprises an single frame.

24. The apparatus of claim 19, further comprising:

a second buffer, coupled to receive a second input bitstream including In Points and Out Points, for storing said second input bitstream and, in response to a second read control signal from said read controller, selectively transmitting at least a portion of said stored second input bitstream.

* * * * *